(12) United States Patent
Li et al.

(10) Patent No.: US 9,615,367 B2
(45) Date of Patent: Apr. 4, 2017

(54) METHOD, DEVICE, AND COMMUNICATION SYSTEM FOR TRANSMISSION CONTROL

(71) Applicant: HUAWEI TECHNOLOGIES CO., LTD., Shenzhen (CN)

(72) Inventors: Yang Li, Shenzhen (CN); Xiaobo Chen, Shenzhen (CN); Yongxia Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 14/567,550

(22) Filed: Dec. 11, 2014

(65) Prior Publication Data
US 2015/0092762 A1    Apr. 2, 2015

Related U.S. Application Data

(63) Continuation of application No. PCT/CN2013/076984, filed on Jun. 8, 2013.

(30) Foreign Application Priority Data

Jun. 15, 2012    (CN) .......................... 2012 1 0197939

(51) Int. Cl.
*H04W 72/04*    (2009.01)

(52) U.S. Cl.
CPC ...... *H04W 72/0446* (2013.01); *H04W 72/042* (2013.01)

(58) Field of Classification Search
None
See application file for complete search history.

(56) References Cited

U.S. PATENT DOCUMENTS

2009/0196204 A1* 8/2009 Astely ................... H04L 1/1635
                                                              370/280
2011/0149813 A1    6/2011 Parkvall et al.
(Continued)

FOREIGN PATENT DOCUMENTS

CN    101414876 A    4/2009
CN    101431362 A    5/2009
(Continued)

OTHER PUBLICATIONS

Huawei et al., "Evaluation of TDD Traffic Adaptive DL-UL Reconfiguration in the Multi-Cell Scenario," 3GPP TSG RAN WG1 Meeting #68bis, Jeju, Korea, Mar. 2012, 6 pages.
(Continued)

*Primary Examiner* — Andrew Lai
*Assistant Examiner* — Jamaal Henson
(74) *Attorney, Agent, or Firm* — Brinks Gilson & Lione (57) ABSTRACT

A transmission control method may include: determining, by an access device, a distribution of a downlink transmission time slot in a first subframe of a first wireless frame, where the first subframe is a special subframe in a case that the first wireless frame has a first configuration periodicity, or the first subframe is a downlink subframe in a case that the first wireless frame has a second configuration periodicity; generating, by the access device, control information for indicating the determined distribution of the downlink transmission time slot in the first subframe; and sending, by the access device, the first wireless frame to a user terminal, where the control information is carried in a downlink control channel of the first subframe of the first wireless frame, or the control information is carried in a previous subframe of the first subframe of the first wireless frame.

15 Claims, 4 Drawing Sheets

(56) References Cited

U.S. PATENT DOCUMENTS

| | | | |
|---|---|---|---|
| 2011/0176461 A1 | 7/2011 | Astely et al. | |
| 2011/0292845 A1* | 12/2011 | Hu | H04W 72/1268 370/280 |
| 2012/0188955 A1* | 7/2012 | Zhang | H04L 5/005 370/329 |
| 2012/0281636 A1* | 11/2012 | Xiao | H04B 7/024 370/329 |
| 2013/0039193 A1* | 2/2013 | Yin | H04W 72/0486 370/252 |
| 2015/0016368 A1 | 1/2015 | Dai et al. | |

FOREIGN PATENT DOCUMENTS

| | | |
|---|---|---|
| CN | 101854720 A | 10/2010 |
| CN | 101888699 A | 11/2010 |
| CN | 102395160 A | 3/2012 |

OTHER PUBLICATIONS

Huawei et al., "Methods to Support Different Time Scales for TDD UL-DL Reconfiguration," 3GPP TSG RAN WG1 Meeting #69, Prague, Czech Republic, May 2012, 4 pages.

Nokia Corporation et al., "Discussion on Methods to Support Different Time Scales for TDD UL-DL Reconfiguration," 3GPP TSG-RAN, WG1 Meeting #69, Prague, Czech Republic, May 2012, 4 pages.

Samsung, "Dynamic Reconfiguration of TDD UL-DL Configuration," 3GPP TSG RAN WG1 Meeting #69, Prague, Czech Republic, May 2012, 2 pages.

\* cited by examiner

METHOD, DEVICE, AND COMMUNICATION SYSTEM FOR TRANSMISSION CONTROL

CROSS-REFERENCE TO RELATED APPLICATIONS

This application is a continuation of International Application No. PCT/CN2013/076984, filed on Jun. 8, 2013, which claims priority to Chinese Patent Application No. 201210197939.2, filed on Jun. 15, 2012, both of which are hereby incorporated by reference in their entireties.

FIELD

The present application relates to the technical field of communication, in particular to a transmission control method, a transmission control device and a communication system.

BACKGROUND

A communication system such as long term evolution (LTE) system, etc, may operate in time division duplexing (TDD) mode, i.e., an uplink (UL) and a downlink (DL) may adopt different time slots of a same frequency. A LTE TDD system may allocate an uplink-downlink configuration (Uplink-Downlink Configuration) in a semi-static manner according to a service type, to meet requirements of different services asymmetrical in terms of the uplink and the downlink.

At present, the LTE TDD system defines 7 uplink-downlink configurations in all. As shown in Table 1, "D" represents a downlink subframe, "U" represents an uplink subframe, and "S" represents a special subframe. Referring to Table 1, in each uplink-downlink configuration, a proportion of time domain resources reserved for a downlink service to the total resources ranges from 40% to 90%. As shown in Table 1, an uplink-downlink switching periodicity (i.e., uplink-downlink configuration periodicity) includes 5 ms and 10 ms. In a configuration periodicity of 5 ms, a wireless frame includes two special subframes, i.e., a subframe 1 and a subframe 6. In a configuration periodicity of 10 ms, a wireless frame includes only one special subframe, i.e., a subframe 1.

TABLE 1

| Index of Uplink-downlink configuration | Configuration periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In an islanding cell or a cell covered by a low-power node, an inter-cell interference has a little effect on the cell. Traffic burst in the uplink and the downlink may have a great effect in a cell which serves a small amount of users. If the uplink-downlink configuration may be adjusted adaptively according to the requirement of uplink-downlink traffic, TDD system may be operated to advantage by using the spectrum resources effectively.

Figure 1A:
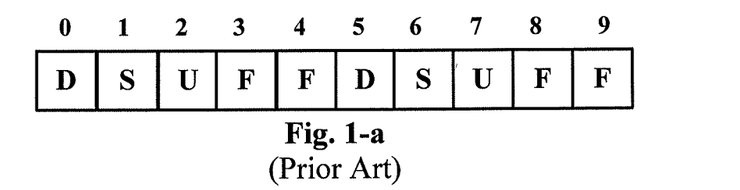

To provide flexibility, a method for adjusting dynamically uplink-downlink configuration is provided. In the method, some flexible subframes may by set in a system, and each flexible subframe in the wireless frame may be configured dynamically to be an uplink subframe or a downlink subframe. FIG. 1-a is a schematic diagram showing a dynamic TDD subframe configuration in a wireless frame, i.e., subframes 3, 4, 8 and 9 in the wireless frame may be flexible subframes.

Figure 1B:
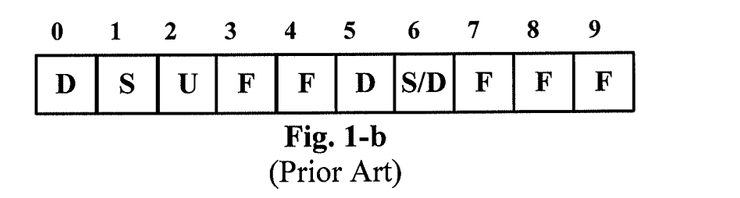

Furthermore, if the uplink-downlink configuration has a configuration periodicity which may switch between 5 ms and 10 ms, subframes 3, 4, 7, 8 and 9 in the wireless subframe may be configured to be flexible subframes, as shown in FIG. 1-b. In practical communication, a type of the subframe 6 is determined from the usage of the subframe 7. If the subframe 7 is used for the uplink transmission, the subframe 6 may be a special subframe, which is configured to switch a transmission from the downlink to the uplink. If the subframe 7 is configured for downlink transmission, the subframe 6 may be a downlink subframe.

In practice, in some application scenarios that the uplink-downlink configuration has a configuration periodicity which may dynamically switch between 5 ms and 10 ms, data receiving errors may sometimes occur to some user terminals, when the user terminal receives data carried in the subframe 6 of a wireless frame.

SUMMARY

A transmission control method, a transmission control device and a communication system are provided according to the application, to reduce receiving errors of a user terminal when the user terminal receives data carried in a subframe (such as the subframe 6) which may be used as a special subframe or a downlink subframe.

To solve the technical issues, a transmission control method is provided according to one aspect of the application. The method includes:

determining, by an access device, a distribution of a downlink transmission time slot in a first subframe of a first wireless frame, wherein the first subframe is a special subframe in a case that the first wireless frame has a first configuration periodicity, or the first subframe is a downlink subframe in a case that the first wireless frame has a second configuration periodicity;

generating, by the access device, control information for indicating the determined distribution of the downlink transmission time slot in the first subframe; and sending, by the access device, the first wireless frame to a user terminal, wherein the control information is carried in a downlink control channel of the first subframe of the first wireless frame, or the control information is carried in a previous subframe of the first subframe of the first wireless frame.

In another aspect of the application, a transmission control method is provided. The method includes:

receiving, by a user terminal, control information carried in a second subframe of a first wireless frame sent by an access device, wherein the control information indicates a distribution of a downlink transmission time slot in a first subframe of the first wireless frame;

determining the distribution of the downlink transmission time slot in the first subframe of the first wireless frame based on the control information; and receiving, by the user terminal, downlink data of the user terminal carried in downlink transmission of the first subframe based on the determined distribution of the downlink transmission time slot in the first subframe, wherein the first subframe is a special subframe in a case that the first wireless frame has a first configuration periodicity, and the first subframe is a downlink subframe in a case that the first wireless frame has a second configuration periodicity, and wherein the first subframe is different from the second subframe or the same as the second subframe.

In another aspect of the application, an access device is provided. The access device includes:

a determining unit configured to determine a distribution of a downlink transmission time slot in a first subframe of a first wireless frame, wherein the first subframe is a special subframe in a case that the first wireless frame has a first configuration periodicity, and the first subframe is a downlink subframe in a case that the first wireless frame has a second configuration periodicity;

a generating unit configured to generate control information for indicating the distribution of the downlink transmission time slot in the first subframe, wherein the distribution is determined by the determining unit; and a transmitter configured to send the first wireless frame to a user terminal, wherein the control information is carried in a downlink control channel of the first subframe of the first wireless frame, or the control information is carried in a previous subframe of the first subframe of the first wireless frame.

In another aspect of the application, a user terminal is provided. The user terminal includes:

a receiver configured to receive control information carried in a second subframe of a first wireless frame sent by an access device, wherein the control information indicates a distribution of a downlink transmission time slot in a first subframe of the first wireless frame; and an acquisition unit configured to determine the distribution of the downlink transmission time slot in the first subframe of the first wireless frame based on the control information;

the receiver is further configured to receive downlink data of the user terminal carried in downlink transmission of the first subframe based on the distribution of the downlink transmission time slot in the first subframe, wherein the distribution is determined by the acquisition unit, the first subframe is a special subframe in a case that the first wireless frame has a first configuration periodicity, and the first subframe is a downlink subframe in a case that the first wireless frame has a second configuration periodicity, and wherein the first subframe is different from the second subframe or the same as the second subframe.

In another aspect of the application, a communication system is provided, the communication system includes:

an access device and a user terminal.

an access device configured to determine a distribution of a downlink transmission time slot in a first subframe of a first wireless frame, wherein the first subframe is a special subframe in a case that the first wireless frame has a first configuration periodicity, and the first subframe is a downlink subframe in a case that the first wireless frame has a second configuration periodicity; to generate control information for indicating the determined distribution of the downlink transmission time slot in the first subframe; and to send the first wireless frame to a user terminal, wherein the control information is carried in a downlink control channel of the first subframe of the first wireless frame, or the control information is carried in a previous subframe of the first subframe of the first wireless frame;

a user terminal configured to receive the control information carried in a second subframe of the first wireless frame sent by the access device; to determine the distribution of the downlink transmission time slot in the first subframe of the first wireless frame based on the control information; to receive downlink data of the user terminal carried in the downlink transmission of the first subframe based on the determined distribution of the downlink transmission time slot in the first subframe, wherein the first subframe is different from the second subframe or the same as the second subframe.

In another aspect of the application, a computer storage medium is provided.

The computer storage medium stores programs, and a part or all of the steps of the transmission control method may be implemented by executing the programs.

In the embodiments of the application, the access device firstly determines a distribution of downlink transmission time slots in a first subframe of a first wireless frame, then generates control information for indicating a determined distribution of the downlink transmission time slots in the first subframe of the first wireless frame, and sends the control information to a user terminal, to provide to the user terminal an indication for the distribution of the downlink transmission time slots in the first subframe of the first wireless frame through the control information. Therefore, the user terminal may obtain the distribution of the downlink transmission time slots in the first subframe of the first wireless frame based on the control information carried in the first wireless frame sent by the access device, thereby reducing the receiving errors of the user terminal when the user terminal receives downlink data carried in the first sub frame of the first wireless frame.

BRIEF DESCRIPTION OF THE DRAWINGS

In order to clearly specify the technical solutions according to the embodiments of the application and the conventional technologies, the drawings in the embodiments and the conventional technical solutions may be briefly described. Obviously, the following drawings are only part of the embodiments of the application, and those skilled in the art may obtain other drawings according to these drawings without creative work.

FIG. 1-*a* is a schematic diagram showing a dynamic TDD subframe configuration in a wireless frame in the conventional technology;

FIG. 1-*b* is a schematic diagram showing another dynamic TDD subframe configuration in a wireless frame in the conventional technology;

DETAILED DESCRIPTION OF EMBODIMENTS

A transmission control method, a transmission control device and a communication system are provided according to embodiments of the application, to reduce receiving errors of a user terminal when the user terminal receives data carried in a subframe (such as the subframe 6) which may be used as a special subframe or a downlink subframe.

To make the solutions provided in the application better understood by those skilled in the art, the technical solutions provided according to the embodiment of the application may be described in details in conjunction with the drawings used in the embodiment of the application. Obviously, the embodiments described in the following are only a few of the embodiments of the application, other embodiments made by those skilled in the art without creatively work based on the embodiments of the application, fall into the protection scope of the application.

The terminologies such as "first", "second", "third" and "fourth" (if present) and the like in the specification, claims or drawings are only used herein to distinguish similar entities, rather than to imply that the actual sequence or order exist between the entities. It may be understood that the data used in this way may be replaced with each other as appropriate, such that the embodiments described herein may be implemented in the order excepting the order described in the drawings or descriptions. Furthermore, terms of "include" and "comprise" or any other variants thereof are intended to be non-exclusive. Therefore, a process, method, system, product or device including a plurality of steps or units are not only limited to the illustrated steps or units, but also include other steps or units which are not illustrated or the steps or units which are inherent to the process, method, product or device.

The application may be described in detail in the following according to embodiments.

It may firstly be noted that the access device in embodiments of the application refers to an entity capable of realizing a function for managing a wireless access of a user terminal, and the access device may have different names, locations and product forms in different networks.

For example, the access device to be described in the following embodiments may be an eNode Base station (eNodeB) in an evolved universal mobile telecommunications system (UMTS) territorial radio access network (E-UTRAN), a home base station (HeNB), other types of base station, relay station or other types of access device.

In the research and practice of the application, in an application scenario that the uplink-downlink configuration has a configuration periodicity which may dynamically switch between 5 ms and 10 ms in the conventional technology, data receiving errors may sometimes occur to some user terminals, when the user terminal receives data carried in a subframe 6 of a wireless frame. The inventor studies the root cause of the data receiving error. For example, in a case that a sub user terminal A1 receives a control signaling for instructing a transmission of uplink data in a subframe 7, the subframe 6 is a special frame inevitably. However, in a case that a user terminal A2 does not receive the instruction for instructing a transmission of the uplink data in the subframe 7, the subframe 7 may be assumed to be a downlink subframe. Furthermore, if the user terminal A2 is scheduled to receive downlink data in the subframe 6, the user terminal A2 may regard the subframe 6 as the downlink subframe; but actually, the subframe 6 is a special subframe at this time. The downlink data may only be sent in a downlink pilot time slot (DwPTS) of the subframe 6, and then the user terminal A2 may regard the subframe 6 as the downlink subframe and receive the data in the entire subframe 6. In this case, a data receiving error may be occurred.

A solution to avoid the data receiving error is provided according to the application. In a system, it is defined that time slot resources identical to the DwPTS in the subframe 6 are configured to fixedly transmit the downlink data, when the subframe 7 is a flexible subframe. However, in the case of a configuration periodicity of 10 ms, especially when a high-speed downlink transmission is performed based on the configuration ration of DL:UL=9:1, a part of resources of the subframe 6 is not available, which results in a resource waste and has a bad effect on the system performance.

A transmission control method according to an embodiment of the application may include: determining, by an access device, a distribution of downlink transmission time slots in a first subframe of a first wireless frame, where the first subframe is a special subframe in a case that the first wireless frame has a first configuration periodicity, and the first subframe is a downlink subframe in a case that the first wireless frame has a second configuration periodicity; generating, by the access device, control information for indicating the determined distribution of the downlink transmission time slots in the first subframe; and sending, by the access device, the first wireless frame to a user terminal, where the control information is carried in a downlink control channel of the first subframe of the first wireless frame, or the control information is carried in a previous subframe of the first subframe of the first wireless frame.

Figure 2:
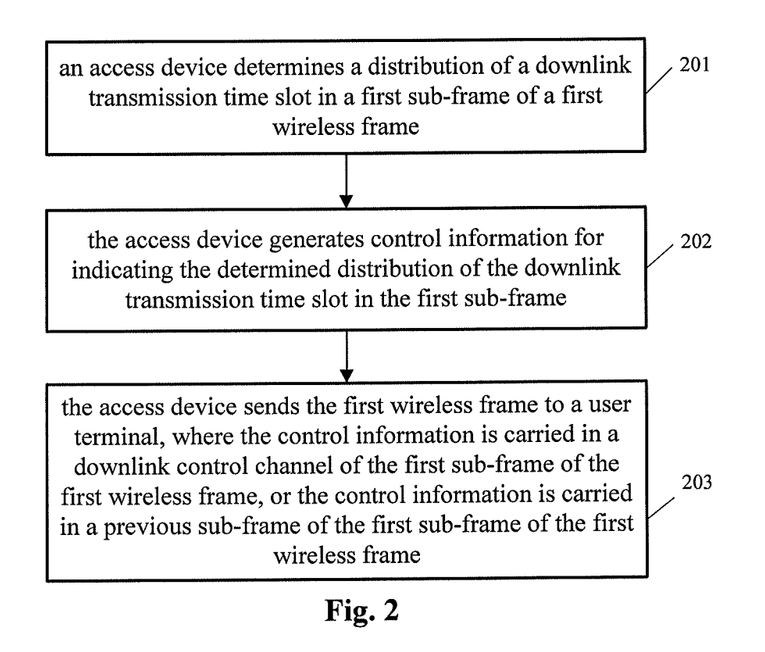
FIG. 2 is a schematic flow chart of a transmission control method according to an embodiment of the application.

As shown in FIG. 2, a transmission control method according to an embodiment of the application may include the steps Step 201 to Step 203 as follows.

In Step 201, an access device determines a distribution of downlink transmission time slots in a first subframe of a first wireless frame.

Before sending the first subframe of the first wireless frame, the access device determines the distribution of the downlink transmission time slots in the first subframe. For example, the access device may determine the distribution of the downlink transmission time slots in the first subframe based on a configuration periodicity of the first wireless frame or a serial number of an uplink-downlink configuration of the first wireless frame. If the first wireless frame has a first configuration periodicity (e.g., 5 ms), the first subframe is a special subframe; if the first wireless frame has a second configuration periodicity (e.g., 10 ms), the first subframe is a downlink subframe. The first wireless frame has a variable configuration periodicity. It is assumed that the access device sends a second wireless frame before sending the first wireless frame; the first and second wireless frames are adjacent; and the configuration periodicity of the first wireless frame is different from the configuration periodicity of the second wireless frame. It is further assumed that the configuration periodicity of the first wireless frame may be 10 ms in a case that the configuration periodicity of the second wireless frame is 5 ms, and the configuration periodicity of the first wireless frame may be 5 ms in a case that the configuration periodicity of the second wireless frame is 10 ms, then the rest may be deduced by analogy; or the first wireless frame may be any wireless frame.

In an embodiment of the application, the access device determines the distribution of the downlink transmission time slots in the first subframe of the first wireless frame. For example, the access device may determine whether a downlink transmission time slot is distributed in the first subframe of the first wireless frame. Alternatively, the access device may determine a distribution proportion or a distribution location of the downlink transmission time slots in the first subframe. In a case that a ratio of the downlink transmission time slots in the first subframe to all data channel time slots in the first subframe is 100% or exceed a certain value, it may be indicated that the first subframe is a downlink subframe. In a case that the ratio of the downlink transmission time slots in the first subframe to all data channel time slots in the first subframe is smaller than 100% or smaller than a certain value, it may be indicated that the first subframe is a special subframe, and the special subframe is configured to switch between the uplink transmission and the downlink transmission.

The access device may determine the distribution of the downlink transmission time slots in the first subframe of the first wireless frame in many ways. For example, the access device may determine whether the downlink transmission in the first subframe of the first wireless frame occupies a part or all of data channel symbols. Alternatively, the access device may determine a location of the data channel symbol occupied by the downlink transmission in the first subframe of the first wireless frame. Alternatively, the access device may determine a range of the downlink transmission time slots in the first subframe of the first wireless frame. Alternatively, the access device may determine the distribution of the downlink transmission time slots in the first subframe by determining a type of the first subframe of the first wireless frame. The access device may determine the type of the first subframe by determining the configuration periodicity of the first wireless frame or by determining the serial number of the uplink-downlink configuration. The distribution of the downlink transmission time slots in the downlink subframe is different from that in the special subframe. If it is determined that the first subframe is the downlink subframe, the ratio of the downlink transmission time slots in the first subframe to all data channel time slots in the first subframe is 100% or exceed a certain value. If the first subframe is the special subframe, the ratio of the downlink transmission time slots in the first subframe to all data channel time slots in the first subframe is smaller than 100% or smaller than a certain value. Therefore, the access device may determine the distribution of the downlink transmission time slots in the first subframe to some extent by determining the type of the first subframe.

In Step 202, the access device generates control information for indicating the determined distribution of the downlink transmission time slots in the first subframe.

In Step 203, the access device sends the first wireless frame to a user terminal, where the control information is carried in a downlink control channel of the first subframe of the first wireless frame, or the control information is carried in a previous subframe of the first subframe of the first wireless frame.

In an embodiment of the application, for example, the first subframe may be a subframe 6 of the first wireless frame.

It may be understood that the first wireless frame may have a variable configuration periodicity (i.e., a current configuration periodicity of the first wireless frame may be changed in relation to a previous configuration periodicity thereof). That is, when the configuration periodicity is changed, the access device may carry the control information in the downlink control channel of the first subframe of the wireless frame having the changed configuration periodicity; or the access device may carry the control information in the previous subframe of the first subframe of the wireless frame having the changed configuration periodicity. In this way, the distribution of the downlink transmission time slots in the first subframe of the wireless frame may be indicated by the control information. The access device may carry the control information in the downlink control channel of the first subframe of each wireless frame (or some wireless frames) or in the previous subframe of the first subframe of each wireless frame (or some wireless frames), to indicate the distribution of the downlink transmission time slots in the first subframe of the wireless frame by the control information.

In an embodiment of the application, the access device generates the control information for indicating the determined distribution of the downlink transmission time slots in the first subframe, and the distribution of the downlink transmission time slots in the first subframe may be indicated directly or indirectly by the control information. For example, the control information may indicate that the downlink transmission in the first subframe occupies a part or all of data channel symbols, and then indicates the distribution of the downlink transmission time slots in the first subframe. In the case that the downlink transmission occupies a part of the data channel symbols in the first subframe, it may be indicated that the first subframe is the special subframe. In the case that the downlink transmission occupies all of the data channel symbols in the first subframe, it may be indicated that the first subframe is the downlink subframe. Alternatively, the control information may indicate a location of the symbol occupied by the downlink transmission of the first subframe, and then indicate the distribution of the downlink transmission time slots in the first subframe. Alternatively, the control information may indicate a range of the downlink transmission time slots in the first subframe, and then indicate the distribution of the downlink transmission time slots in the first subframe. Alternatively, the control information may indicate a type of the first subframe, and then indicate the distribution of the downlink transmission time slots in the first subframe. The control information may indicate the type of the first subframe in many ways. For example, the control information may include an identifier of the type of the first subframe, and the type of the first subframe may be indicated by the identifier of the type. Alternatively, the control information may include an identifier of the configuration periodicity of the first wireless frame, to indicate the configuration periodicity of the first wireless frame by the identifier of the configuration periodicity, and then the type of the first subframe is indicated indirectly as long as the configuration periodicity of the first wireless frame is indicated. As shown in Table 1, the first subframe of the wireless frame with a configuration periodicity of 5 ms is the special subframe, while the first subframe of the wireless frame with a configuration periodicity of 10 ms is the downlink subframe. Therefore, the control information may indicate indirectly the type of the first subframe of the first wireless frame as long as the configuration periodicity of the first wireless frame is indicated. Alternatively, the control information may include the serial number of the uplink-downlink configuration of the first wireless frame, to indicate the uplink-downlink configuration of the first wireless frame by the serial number of the uplink-downlink configuration, and then the type of the first subframe is indicated indirectly as long as the uplink-downlink configuration of the first wireless frame is indicated. As shown in Table 1, the type of the first subframe of the wireless frame, corresponding to a certain serial number of the uplink-downlink configuration, may be determined. For example, the first subframe of the wireless frame corresponding to one of the serial numbers 0-2 and 6 of the uplink-downlink configurations is the special subframe; and the first subframe of the wireless frame corresponding to one of the serial numbers 3-5 of the uplink-downlink configurations is the downlink subframe. Therefore, the type of the first subframe is indicated indirectly as long as the control information include the serial number of the uplink-downlink configuration of the first wireless frame, and then the distribution of the downlink transmission time slots in the first subframe is indicated indirectly, and the rest may be deduced by analogy.

The technical solution in the embodiment of the application may be applied to a time division duplex communication system or other similar systems.

Therefore, the access device firstly determines a distribution of downlink transmission time slots in a first subframe of a first wireless frame; then generates control information for indicating the determined distribution of the downlink transmission time slots in the first subframe of the first wireless frame, and sends the control information to a user terminal, such that the distribution of the downlink transmission time slots in the first subframe of the first wireless frame may be indicated to the user terminal by the control information. Therefore, the user terminal may obtain the distribution of the downlink transmission time slots in the first subframe of the first wireless frame based on the control information carried in the first wireless frame sent by the access device, thereby reducing receiving errors of the user terminal when the user terminal receives data carried in the first subframe of the first wireless frame.

A transmission control method is provided according to another embodiment of the application, including: receiving, by a user terminal, control information carried in a second subframe of a first wireless frame sent by an access device, where the control information indicates a distribution of downlink transmission time slots in a first subframe of the first wireless frame; determining the distribution of the downlink transmission time slots in the first subframe of the first wireless frame based on the control information; receiving downlink data of the user terminal carried in the downlink transmission of the first subframe based on the determined distribution of the downlink transmission time slots in the first subframe, where the first subframe is a special subframe in a case that the first wireless frame has a first configuration periodicity, or the first subframe is a downlink subframe in a case that the first wireless frame has a second configuration periodicity, and where the first subframe is a subframe different from the second subframe or the same subframe as the second subframe.

Figure 3:
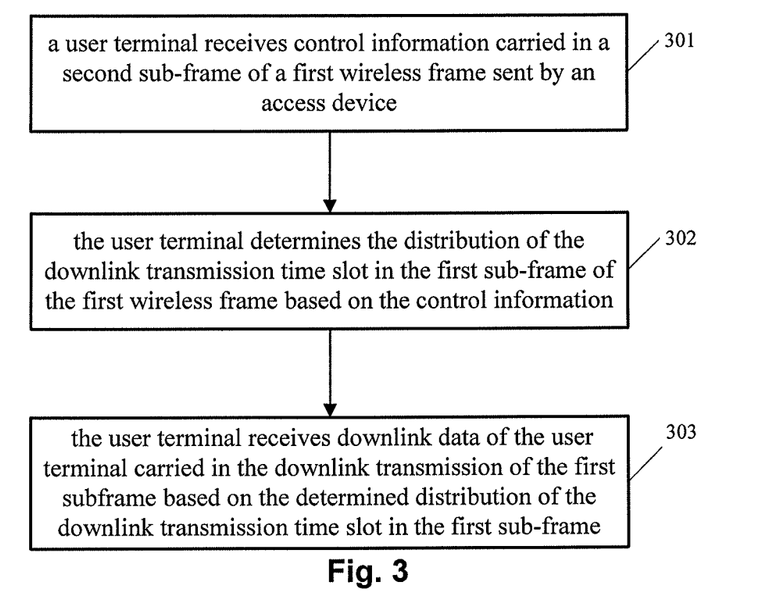
FIG. 3 is a schematic flow chart of a transmission control method according to another embodiment of the application.

As shown in FIG. 3, a transmission control method according to an embodiment of the application may include the steps Step 301 to Step 303 as follows.

In Step 301, a user terminal receives control information carried in a second subframe of a first wireless frame sent by an access device. The control information indicates a distribution of downlink transmission time slots in a first subframe of the first wireless frame.

In an embodiment of the application, the control information may indicate the distribution of the downlink transmission time slots in the first subframe of the first wireless frame, which may directly or indirectly indicate whether a downlink transmission time slot is distributed in the first subframe of the first wireless frame, may directly or indirectly indicate a distribution proportion or distribution location of the downlink transmission time slots in the first subframe. All above instances may be regarded as that the control information indicates the distribution of the downlink transmission time slots in the first subframe of the first wireless frame.

In an embodiment of the application, for example, the first subframe may be a subframe 6 of the first wireless frame.

The first wireless frame has a variable configuration periodicity (i.e., a current configuration periodicity of the first wireless frame may be changed in relation to a previous configuration periodicity thereof). It is assumed that the access device sends a second wireless frame before sending the first wireless frame, the first and the second wireless frames are adjacent, and the configuration periodicity of the first wireless frame is different from the configuration periodicity of the second wireless frame. It is further assumed that the configuration periodicity of the first wireless frame may be 10 ms in a case that the configuration periodicity of the second wireless frame is 5 ms, and the configuration periodicity of the first wireless frame may be 5 ms in a case that the configuration periodicity of the second wireless frame is 10 ms, then the rest may be deduced by analogy; or the first wireless frame may be any wireless frame.

In Step 302, the user terminal determines the distribution of the downlink transmission time slots in the first subframe of the first wireless frame based on the control information.

For example, if the first subframe is the subframe 6 of the first wireless frame, the user terminal may determine the distribution of the downlink transmission time slots in the subframe 6 of the first wireless frame based on the control information.

In Step 303, the user terminal receives downlink data of the user terminal carried in the downlink transmission of the first subframe, based on the determined distribution of the downlink transmission time slots in the first subframe.

The first subframe is a special subframe in a case that the first wireless frame has a first configuration periodicity, or the first subframe is a downlink subframe in a case that the first wireless frame has a second configuration periodicity, where the first subframe is a subframe different from the second subframe or the same subframe as the second subframe.

For example, the user terminal may receive the downlink data of the user terminal carried in the downlink transmission of the first subframe via a part of data channel symbols of the first subframe, in the case that the control information indicates that the downlink transmission of the first subframe occupies a part of the data channel symbols. Alternatively, the user terminal may receive the downlink data of the user terminal carried in the downlink transmission of the first subframe via all of data channel symbols of the first subframe, in a case that the control information indicates that the downlink transmission of the first subframe occupies all of the data channel symbols. Alternatively, the user terminal may receive the downlink data of the user terminal carried in the downlink transmission of the first subframe, at an indicated location of the data channel symbol occupied by the downlink transmission in the first subframe, in a case that the control information indicates the location of the data channel symbol occupied by the downlink transmission in the first subframe. Alternatively, the user terminal may receive the downlink data of the user terminal carried in the downlink transmission of the first subframe, within an indicated range of the downlink transmission time slots in the first subframe, in a case that the control information indicates that the range of the downlink transmission time slots in the first subframe. Alternatively, in a case that the control information indicates a type of the first subframe (e.g., the control information includes an identifier of the type of the first subframe, the configuration periodicity of the first wireless frame and/or a serial number of an uplink-downlink configuration of the first wireless frame, each of which may directly or indirectly indicate the type of the first subframe), the user terminal may receive, within the range of the downlink transmission time slots corresponding to the type of the first subframe, the downlink data of the user terminal carried in the downlink transmission of the first subframe.

The technical solution in the embodiment of the application may be applied to a time division duplex communication system or other similar systems.

Therefore, in the embodiment, an access device sends to a user terminal control information for indicating a distributing of downlink transmission time slots in a first subframe of a first wireless frame. If receiving the control information carried in a second subframe of the first wireless frame sent by the access device, the user terminal may obtain the distribution of the downlink transmission time slots in the first subframe of the first wireless frame based on the control information, and then may receive downlink data of the user terminal carried in the downlink transmission of the first subframe based on the distribution of the downlink transmission time slots in the first subframe, where the distribution is indicated by the control information. In this way, the receiving errors of the user terminal may be reduced when the user terminal receives the downlink data carried in the first subframe of the first wireless frame.

To understand the technical solution in the embodiment better, the technical solution will be described in detail by taking an application scenario as an example.

Figure 4:
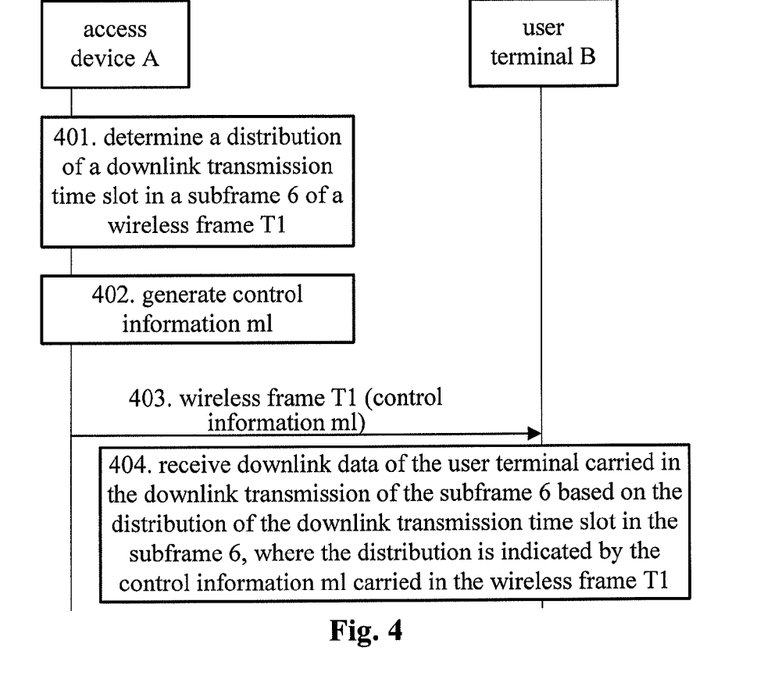
FIG. 4 is a schematic flow chart of a transmission control method according to another embodiment of the application.

As shown in FIG. 4, a transmission control method according to an embodiment of the application may include the steps Step 401 to Step 404 as follows.

In Step 401, an access device A determines a distribution of downlink transmission time slots in a subframe 6 of a wireless frame T1 (e.g., a first wireless frame).

Before sending the subframe 6 of the wireless frame T1, the access device A determines the distribution of the downlink transmission time slots in the subframe 6. For example, the access device A may determine the distribution of the downlink transmission time slots in the subframe 6 based on a configuration periodicity of the wireless frame T1 or a serial number of an uplink-downlink configuration of the wireless frame T1. If the wireless frame T1 has a first configuration periodicity (e.g., 5 ms), the subframe 6 is a special subframe. If the wireless frame T1 has a second configuration periodicity (e.g., 10 ms), the subframe 6 is a downlink subframe. The wireless frame T1 may have a variable configuration periodicity. It is assumed that the access device A sends a second wireless frame before sending the wireless frame T1, the wireless frame T1 is an adjacent frame of the second wireless frame, and the configuration periodicity of the wireless frame T1 is different from the configuration periodicity of the second wireless frame. It is further assumed that the configuration periodicity of the wireless frame T1 may be 10 ms in a case that the configuration periodicity of the second wireless frame is 5 ms, and the configuration periodicity of the wireless frame T1 may be 5 ms in a case that the configuration periodicity of the second wireless frame is 10 ms, then the rest may be deduced by analogy; or the wireless frame T1 may be any wireless frame.

In an embodiment of the application, the access device determines the distribution of the downlink transmission time slots in the subframe 6 of the wireless frame T1. For example, the access device may determine whether a downlink transmission time slot is distributed in the subframe 6 of the wireless frame T1. Alternatively, the access device may determine a distribution proportion or a distribution location of the downlink transmission time slots in the subframe 6. In a case that a ratio of the downlink transmission time slots in the subframe 6 of the wireless frame T1 to all data channel time slots of the subframe 6 is 100% or exceed a certain value, it may be indicated that the subframe 6 is a downlink subframe. In a case that a ratio of the downlink transmission time slots in the subframe 6 of the wireless frame T1 to all data channel time slots of the subframe 6 is smaller than 100% or are smaller than a certain value, it may be indicated that the subframe 6 is a special subframe.

The access device may determine the distribution of the downlink transmission time slots in the subframe 6 of the wireless frame T1 in many ways. For example, the access device may determine whether the downlink transmission in the subframe 6 of the wireless frame T1 occupies a part or all of data channel symbols. Alternatively, the access device may determine a location of the data channel symbol occupied by the downlink transmission in the subframe 6 of the wireless frame T1. Alternatively, the access device may determine a range of the downlink transmission time slots in the subframe 6 of the wireless frame T1. Alternatively, the access device may determine the distribution of the downlink transmission time slots in the subframe 6 by determining a type of the subframe 6 of the wireless frame T1. The access device may determine the type of the subframe 6 by determining the configuration periodicity of the wireless frame T1 or by determining the serial number of the uplink-downlink configuration. The distribution of the downlink transmission time slots in the downlink subframe is different from that in the special subframe. If it is determined that the subframe 6 is a downlink subframe, the ratio of the downlink transmission time slots in the subframe 6 to all data channel time slots in the subframe 6 is 100% or exceed a certain value. If the subframe 6 is the special subframe, the ratio of the downlink transmission time slots in the subframe 6 to all data channel time slots in the subframe 6 is smaller than 100% or smaller than a certain value. Therefore, the access device may determine the distribution of the downlink transmission time slots in the subframe 6 to some extent by determining the type of the subframe 6.

In Step 402, the access device A generates control information m1.

The control information m1 indicates the distribution of the downlink transmission time slots in the subframe 6 of the wireless frame T1.

In Step 403, the access device A sends the wireless frame T1 to a user terminal B.

The control information is carried in a downlink control channel of the subframe 6 of the wireless frame T1 (e.g., a first wireless frame), or the control information is carried in a previous subframe of the subframe 6 of the wireless frame T1.

The control information m1 carried in the wireless frame T1 may be any information for indicating whether a downlink transmission time slot is distributed in the subframe 6. Alternatively, the control information m1 may be, for example, any information for indicating a distribution proportion of the downlink transmission time slot in the subframe 6. Alternatively, the control information may be, for example, any information for indicating the distribution location of the downlink transmission time slot in the subframe 6. Alternatively, the access device A may directly or indirectly indicate the distribution of the downlink transmission time slot in the subframe 6 of the wireless frame T1 based on the control information m1 carried in the wireless T1 in other ways.

In an embodiment of the application, the wireless frame T1 may have a variable configuration periodicity. That is, when the configuration periodicity is changed, the access device A may carry the control information m1 in the downlink control channel of the subframe 6 of the wireless frame having the changed configuration periodicity; or the access device A may carry the control information m1 in a periodicity subframe of the subframe 6 of the wireless frame having the changed configuration periodicity. In this way, the distribution of the downlink transmission time slots in the subframe 6 of the wireless frame may be indicated by the control information ml. In addition, the access device A may carry the control information in the downlink control channel of the subframe 6 of each wireless frame (or some wireless frames) or in the previous subframe of the subframe 6 of each wireless frame (or some wireless frames), so as to indicate the distribution of the downlink transmission time slots in the subframe 6 of the wireless frame by the control information.

In Step 404, the user terminal B receives the control information ml carried in the wireless frame T1; determines the distribution of the downlink transmission time slots in the subframe 6 based on the control information ml; and receives downlink data of the user terminal carried in the downlink transmission of the subframe 6 based on the determined distribution of the downlink transmission time slots in the subframe 6.

For example, in the case that the control information ml indicates that the downlink transmission in the subframe 6 of the wireless frame T1 occupies a part of the data channel symbols, the user terminal B may receive the downlink data of the user terminal B carried in the downlink transmission of the subframe 6, via the part of data channel symbols of the subframe 6 of the wireless frame T1. Alternatively, in the case that the control information ml indicates that the downlink transmission in the subframe 6 of the wireless frame T1 occupies all data channel symbols, the user terminal B may receive the downlink data of the user terminal B carried in the downlink transmission of the subframe 6, via all of the data channel symbols of the subframe 6. Alternatively, in the case that the control information ml indicates a location of the data channel symbol occupied by the downlink transmission in the subframe 6 of the wireless frame T1, the user terminal B may receive the downlink data of the user terminal B carried in the downlink transmission of the subframe 6, at the indicated location of the data channel symbol occupied by the downlink transmission of the subframe 6. Alternatively, in the case that the control information ml indicates a range of the downlink transmission time slots in the subframe 6 of the wireless frame T1, the user terminal B may receive, within the indicated range of the downlink transmission time slots in the subframe 6, the downlink data of the user terminal B carried in the downlink transmission of the subframe 6. Alternatively, in the case that the control information ml indicates a type of the subframe 6 (e.g., the control information includes an identifier of the type of the subframe 6, the configuration periodicity of the wireless frame T1 and/or a serial number of an uplink-downlink configuration of the wireless frame T1, each of which may directly or indirectly indicate the type of the subframe 6), the user terminal B may receive, within the range of the downlink transmission time slots corresponding to the type of the subframe 6, the downlink data of the user terminal B carried in the downlink transmission of the subframe 6; then the rest may be deduced by analogy.

Therefore, in an embodiment, the control information is carried in the downlink control channel of the subframe 6 of the wireless frame sent from the access device to the user terminal, or in the previous subframe of the subframe 6 of the wireless frame. The control information is configured to indicate the distribution of the downlink transmission time slots in the subframe 6 of the wireless frame. Once receiving the carried control information from a subframe sent by the access device, the user terminal may obtain the distribution of the downlink transmission time slots in the subframe 6 of the wireless frame based on the control information carried in the wireless frame sent by the access device. Thus, receiving errors of the user terminal may be reduced when the user terminal receives downlink data carried in the subframe 6 of the wireless frame.

It may be understood that the embodiment is illustrated by taking the case that the access device indicates the distribution of the downlink transmission time slots in the subframe 6 of the wireless frame as an example. Alternatively, in other application scenarios, the subframe 6 may be either a characteristic subframe or a downlink subframe of the wireless subframe, which may be processed in the foregoing ways.

The technical solution in the embodiment of the application may be applied to a time division duplex communication system or other similar systems.

To implement better the technical solution in the embodiment of the application, a device for implementing the technical solution in the embodiment of the application is provided.

Figure 5:
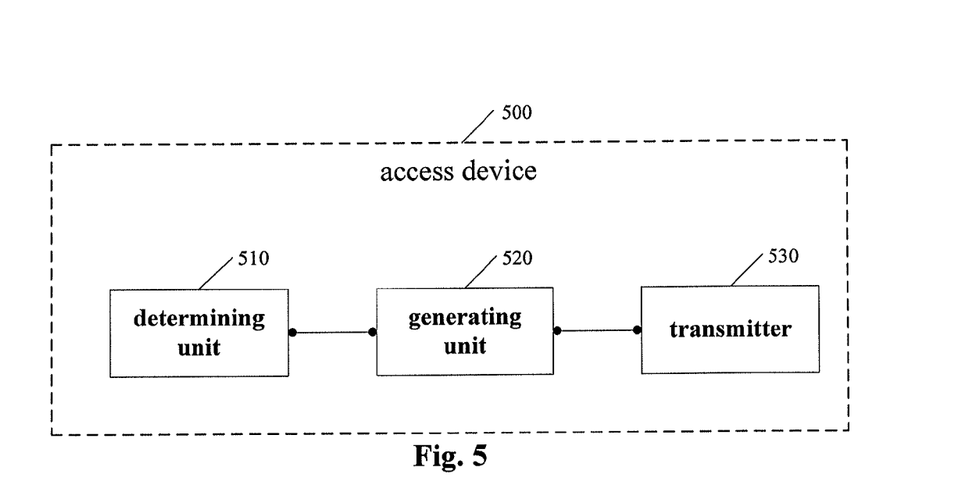
FIG. 5 is a schematic diagram of an access device according to an embodiment of the application.

As shown in FIG. 5, an access device 500 is provided according to an embodiment of the application, which may be configured to cooperatively implement the method provided in the method embodiments. For specific principles, reference may be made to the description of the method embodiments. The access device 500 may include a determining unit 510, a generating unit 520 and a transmitter 530.

The determining unit 510 is configured to determine a distribution of downlink transmission time slots in a first subframe of a first wireless frame. The first subframe is a special subframe in a case that the first wireless frame has a first configuration periodicity, or the first subframe is a downlink subframe in a case that the first wireless frame has a second configuration periodicity.

The first wireless frame may have a variable configuration periodicity, or the first wireless frame may be any wireless frame.

In an embodiment of the application, the first configuration periodicity may be 5 ms, and the second configuration periodicity may be 10 ms. In addition, the first configuration periodicity and/or the second configuration periodicity may also be other time length.

In an embodiment of the application, the determining unit 510 is configured to determine the distribution of the downlink transmission time slots in the first subframe of the first wireless frame in a case that the configuration periodicity of the first wireless frame is different from that of a previous wireless frame of the first wireless frame.

The generating unit 520 is configured to generate control information for indicating the distribution of the downlink transmission time slots in the first subframe, where the distribution is determined by the determining unit 510.

The transmitter 530 is configured to send the first wireless frame to a user terminal, where the control information generated by the generating unit 520 is carried in a downlink control channel of the first subframe of the first wireless frame, or the control information generated by the generating unit 520 is carried by a previous subframe of the first subframe of the first wireless frame.

In an embodiment of the application, the determining unit 520 may be configured to determine whether the downlink transmission in the first subframe of the first wireless frame occupies a part or all of data channel symbols; or to determine a location of the data channel symbol occupied by the downlink transmission in the first subframe of the first wireless frame; or to determine a range of the downlink transmission time slots in the first subframe of the first wireless frame; or to determine the distribution of the downlink transmission time slots in the first subframe by determining a type of the first subframe of the first wireless frame.

In an embodiment of the application, the first subframe may be a subframe 6 of the first wireless frame. The determining unit 510 is further configured to determine the distribution of the downlink transmission time slots in the subframe 6 of the first wireless frame.

It may be understood that the access device 500 according to the embodiment may be the access device provided in the method embodiments, and the functions of the functional units may be implemented based on the method in the method embodiments, which will be omitted herein.

The technical solution in the embodiment of the application may be applied to a time division duplex communication system or other similar systems.

Therefore, the access device 500 firstly determines a distribution of downlink transmission time slots in a first subframe of a first wireless frame, then generates control information for indicating the determined distribution of the downlink transmission time slots in the first subframe of the first wireless frame, and sends the control information to a user terminal. In this way, the distribution of the downlink transmission time slots in the first subframe of the first wireless frame may be indicated to the user terminal through the control information. Therefore, the user terminal may obtain the distribution of the downlink transmission time slots in the first subframe of the first wireless frame based on the control information carried in the first wireless frame sent by the access device, thereby reducing the receiving errors of the user terminal when the user terminal receives data carried in the first subframe of the first wireless frame.

Figure 6:
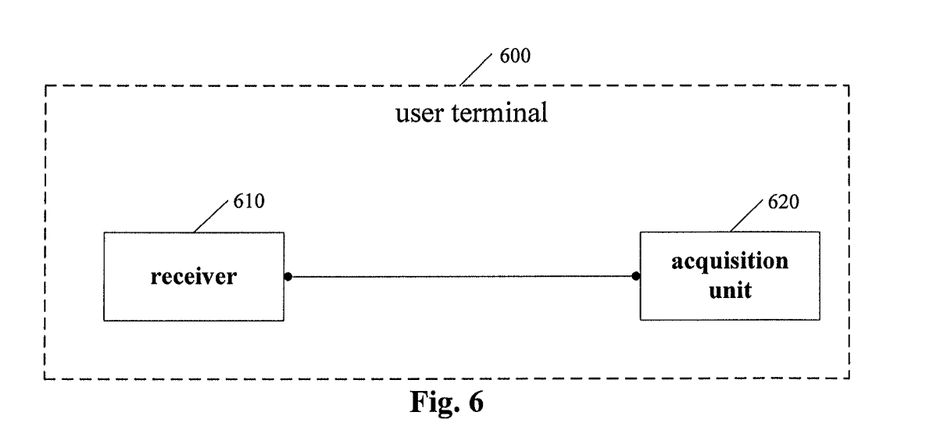
FIG. 6 is a schematic diagram of a user terminal according to an embodiment of the application.

As shown in FIG. 6, a user terminal 600 is provided according to an embodiment of the application, where the user terminal 600 may be configured to cooperatively implement the method provided in the method embodiments. For specific principles, reference may be made to the description of the method embodiment.

The user terminal 600 includes a receiver 610 and an acquisition unit 620.

The receiver 610 is configured to receive control information carried in a second subframe of a first wireless frame sent by an access device, where the control information indicates a distribution of downlink transmission time slots in a first subframe of the first wireless frame.

The acquisition unit 620 is configured to determine the distribution of the downlink transmission time slots in the first subframe of the first wireless frame, based on the control information.

The receiver 610 is further configured to receive downlink data of the user terminal 600 carried in the downlink transmission of the first subframe, based on the distribution of the downlink transmission time slots in the first subframe, where the distribution is determined by the acquisition unit 620. The first subframe is a special subframe in a case that the first wireless frame has a first configuration periodicity, or the first subframe is a downlink subframe in a case that the first wireless frame has a second configuration periodicity. The first subframe is different from the second subframe or the same as the second subframe.

The first wireless frame may have a variable configuration periodicity, or the first wireless frame may be any wireless frame.

In an embodiment of the application, the first subframe may be a subframe 6 of the first wireless frame. The acquisition unit 620 is configured to determine the distribution of the downlink transmission time slots in the subframe 6 of the first wireless frame based on the control information.

In an embodiment of the application, for example, the first wireless frame may have a variable configuration periodicity (i.e., the configuration periodicity of the first wireless frame is different from that of a previous wireless frame of the first wireless frame). That is, when the configuration periodicity is changed, the access device may carry the control information in the downlink control channel of the first subframe of the wireless frame having the changed configuration periodicity; or the access device may carry the control information in the previous subframe of the first subframe of the wireless frame having the changed configuration periodicity. In this way, the distribution of the downlink transmission time slots in the first subframe of the wireless frame may be indicated by the control information. The access device may carry the control information in the downlink control channel of the first subframe of each wireless frame (or some wireless frames) or in the previous subframe of the first subframe of each wireless frame (or some wireless frames), to indicate the distribution of the downlink transmission time slots in the first subframe of the wireless frame by the control information.

In an embodiment of the application, the receiver 610 is configured to receive the downlink data of the user terminal 600 carried in the downlink transmission of the first subframe via a part of data channel symbols of the first subframe, in the case that the acquisition unit 620 determines that the part of the data channel symbols is occupied by the downlink transmission of the first subframe.

In another embodiment of the application, the receiver 610 is configured to receive the downlink data of the user terminal 600 carried in the downlink transmission of the first subframe via all data channel symbols of the first subframe, in the case that the acquisition unit 620 determines that all data channel symbols are occupied by the downlink transmission of the first subframe.

In another embodiment of the application, the receiver 610 is configured to receive the downlink data of the user terminal 600 carried in the downlink transmission of the first subframe at a location of the data channel symbol occupied by the downlink transmission of the first subframe, in the case that the acquisition unit 620 determines the location of the data channel symbol occupied by the downlink transmission of the first subframe, where the location is indicated by the control information.

In another embodiment of the application, the receiver 610 is configured to receive the downlink data of the user terminal 600 carried in the downlink transmission of the first subframe within a range of the downlink transmission time slots in the first subframe, in the case that the acquisition unit 620 determines the range of the downlink transmission time slots in the first subframe, where the range is indicated by the control information.

In another embodiment of the application, the receiver 610 is configured to receive the downlink data of the user terminal 600 carried in the downlink transmission of the first subframe within a range of the downlink transmission time slots corresponding to a type of the first subframe, in the case that the acquisition unit 620 determines the type of the subframe.

It may be understood that the user terminal 600 in the embodiment may be the same as the user terminal in the foregoing method embodiments, and the functions of the functional units may be implemented based on the method in the method embodiments, and detailed description thereof is omitted herein.

The technical solution in the embodiment of the application may be applied to a time division duplex communication system or other similar systems.

Therefore, in the embodiment, an access device sends to a user terminal 600 control information for indicating a distributing of downlink transmission time slots in a first subframe of a first wireless frame. If the user terminal 600 receives the control information at a second subframe of the first wireless frame sent by the access device, the user terminal 600 may obtain the distribution of the downlink transmission time slots in the first subframe of the first wireless frame based on the control information, and then may receive downlink data of the user terminal 600 carried in the downlink transmission of the first subframe based on the distribution of the downlink transmission time slots in the first subframe, where the distribution is indicated by the control information. In this way, the receiving errors by the user terminal are reduced when the user terminal receives the downlink data carried in the first subframe of the first wireless frame.

Figure 7:
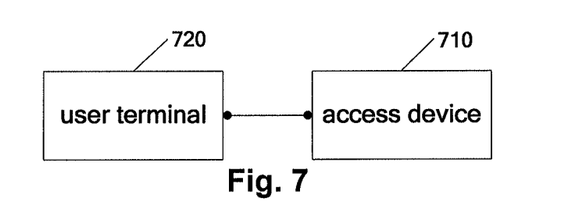
FIG. 7 is a schematic diagram of a communication system according to an embodiment of the application.

As shown in FIG. 7, a communication system is provided according to an embodiment of the application.

The communication system may include an access device 710 and a user terminal 720.

The access device 710 is configured to determine a distribution of downlink transmission time slots in a first subframe of a first wireless frame, where the first subframe is a special subframe in a case that the first wireless frame has a first configuration periodicity, or the first subframe is a downlink subframe in a case that the first wireless frame has a second configuration periodicity; to generate control information for indicating the determined distribution of the downlink transmission time slots in the first subframe; and to send the first wireless frame to a user terminal 720, where the control information is carried in a downlink control channel of the first subframe of the first wireless frame, or the control information is carried in a previous subframe of the first subframe of the first wireless frame.

In an embodiment of the application, the access device 710 generates the control information for indicating the determined distribution of the downlink transmission time slots in the first subframe, where the control information may directly or indirectly indicate the distribution of the downlink transmission time slots in the first subframe. For example, the control information may indicate that the downlink transmission of the first subframe occupies a part or all of data channel symbols, so as to indicate the distribution of the downlink transmission time slots in the first subframe. If the downlink transmission occupies a part of the data channel symbols, it may be indicated that the first subframe is the special subframe. If the downlink transmission occupies all of the data channel symbols, it may be indicated that the first subframe is the downlink subframe. Alternatively, the control information may indicate a location of the symbol occupied by the downlink transmission of the first subframe, so as to indicate the distribution of the downlink transmission time slots in the first subframe. Alternatively, the control information may indicate a range of the downlink transmission time slots in the first subframe, to indicate the distribution of the downlink transmission time slots in the first subframe. Alternatively, the control information may indicate a type of the first subframe, to indicate the distribution of the downlink transmission time slots in the first subframe. The control information may indicate the type of the first sub frame in many ways. For example, the control information may include an identifier of the type of the first subframe, and thus the type of the first subframe may be indicated through the identifier of the type. Alternatively, the control information may include an identifier of the configuration periodicity of the first wireless frame, and thus the configuration periodicity of the first wireless frame may be indicated through the identifier of the configuration periodicity. The type of the first subframe is indirectly indicated as long as the configuration periodicity of the first wireless frame is indicated. As shown in Table 1, the first subframe of the wireless frame with a configuration periodicity of 5 ms is the special subframe, while the first subframe of the wireless frame with a configuration periodicity of 10 ms is the downlink subframe. Therefore, the control information may indirectly indicate the type of the first subframe of the first wireless frame as long as indicate the configuration periodicity of the first wireless frame. Alternatively, the control information may include a serial number of the uplink-downlink configuration of the first wireless frame, to indicate the uplink-downlink configuration of the first wireless frame through the serial number of the uplink-downlink configuration, and thus the type of the first subframe is indirectly indicated as long as the uplink-downlink configuration of the first wireless frame is indicated. As shown in Table 1, the wireless frame corresponding to a certain serial number of the uplink-downlink configuration has a determined type of the first subframe. For example, the first subframe of the wireless frame corresponding to each of the serial numbers 0-2 and 6 of the uplink-downlink configurations is the special subframe, and the first subframe of the wireless frame corresponding to each of the serial numbers 3-5 of the uplink-downlink configuration is the downlink subframe. Therefore, when the control information include the serial number of the uplink-downlink configuration of the first wireless frame, the type of the first subframe is indirectly indicated, thus the distribution of the downlink transmission time slots in the first subframe is indirectly indicated, and the rest may be deduced by analogy.

The first wireless frame may have a variable configuration periodicity, or the first wireless frame may be any wireless frame.

In an embodiment of the application, the first subframe may a subframe 6 of the first wireless frame.

The user terminal 720 is configured to receive the control information carried in a second subframe of the first wireless frame sent by the access device 710; to determine the distribution of the downlink transmission time slots in the first subframe of the first wireless frame based on the control information; to receive downlink data of the user terminal 720 carried in the downlink transmission of the first subframe based on the determined distribution of the downlink transmission time slots in the first subframe, where the first subframe is different from the second subframe or the same as the second subframe.

For example, in the case that the control information indicates that the downlink transmission of the first subframe occupies a part of the data channel symbols, the user terminal 720 may receive the downlink data of the user terminal 720 carried in the downlink transmission of the first subframe, via the part of data channel symbols of the first subframe. Alternatively, in the case that the control information indicates that the downlink transmission of the first subframe occupies all of the data channel symbols, the user terminal 720 may receive the downlink data of the user terminal 720 carried in the downlink transmission of the first subframe via all of the data channel symbols of the first subframe. Alternatively, in the case that the control information indicates the location of the data channel symbol occupied by the downlink transmission of the first subframe, the user terminal 720 may receive the downlink data of the user terminal 720 carried in the downlink transmission of the first subframe, at the indicated location of the data channel symbol occupied by the downlink transmission of the first subframe. Alternatively, in the case that the control information indicates a range of the downlink transmission time slots in the first subframe, the user terminal 720 may receive, within the indicated range of the downlink transmission time slots in the first subframe, the downlink data of the user terminal 720 carried in the downlink transmission of the first subframe. Alternatively, in the case that the control information indicates a type of the first subframe (e.g., the control information includes an identifier of the type of the first subframe, the configuration periodicity of the first wireless frame and/or a serial number of an uplink-downlink configuration of the first wireless frame, each of which may directly or indirectly indicate the type of the first subframe), the user terminal 720 may receive, within the range of the downlink transmission time slots corresponding to the type of the first subframe, the downlink data of the user terminal carried in the downlink transmission of the first subframe.

It may be understood that the user terminal 720 in the embodiment may be the same as the user terminal 600 in the foregoing embodiment or terminal devices in the foregoing method embodiments, and the access device 710 may be the same as the access device 500 in the foregoing embodiment or access devices in the foregoing method embodiments. The functions of the functional units may be implemented based on the method in the method embodiments, and detailed description thereof is omitted herein.

In another aspect, a computer storage medium is provided according to an embodiment of application.

The computer storage medium stores programs, and a part or all of steps of the transmission control method may be implemented by executing the programs.

It may be noted that for the convenience of description, the method embodiments set forth are described as combinations of a series of actions. Those skilled in the art may understand that the application is not limited in the sequence of these actions, as certain steps may be performed in other sequence or be performed simultaneously based on the description of the application. In addition, those skilled in the art may further understand that the embodiments described in the specification are only the preferable embodiments, and the relevant actions and modules may be unnecessary for the application.

The descriptions in the foregoing embodiments focus on different aspects, which may provide references for each other.

Generally, in the embodiments of the application, the access device determines a distribution of downlink transmission time slots in a first subframe of a first wireless frame first, generates control information for indicating the determined distribution of the downlink transmission time slots in the first subframe of the first wireless frame, and sends the control information to a user terminal, to provide to the user terminal an indication for the distribution of the downlink transmission time slots in the first subframe of the first wireless frame through the control information. Therefore, the user terminal may obtain the distribution of the downlink transmission time slots in the first subframe of the first wireless frame based on the control information carried in the first wireless frame sent by the access device. Then, the user terminal may receive downlink data of the user terminal carried in the downlink transmission of the first subframe based on the distribution of the downlink transmission time slots in the first subframe, where the distribution is indicated by the control information. In this way, the receiving errors of the user terminal are reduced when the user terminal receives the downlink data carried in the first subframe of the first wireless frame.

Those skilled in the art may understand that a few or all of the steps in the methods provided according to the foregoing embodiments may be implemented by instructing hardware via a programs, where the program may be stored in a computer-readable storage medium, and the storage medium may include, for example, a read-only memory, a random access memory, a disk or an optical disk.

A transmission control method, a transmission control device and a communication system according to the embodiment of the application are specified hereinbefore, and the principle and implementation of the application are illustrated via specific cases. The description of the foregoing embodiments is only to facilitate understanding the method and principle of the application. The variations of the implementation and application scope of the application may be made by those skilled in the art based on the principle of the application. In general, the specification is not meant limit the application.

The invention claimed is:

1. A transmission control method, comprising:
   determining, by an access device, a distribution of a downlink transmission time slot in a first subframe of a first wireless frame, wherein the first subframe is a special subframe in a case that the first wireless frame has a first configuration periodicity, or the first subframe is a downlink subframe in a case that the first wireless frame has a second configuration periodicity;
   generating, by the access device, control information for indicating the determined distribution of the downlink transmission time slot in the first subframe; and
   sending, by the access device, the first wireless frame to a user terminal, wherein the control information is carried in a downlink control channel of the first subframe of the first wireless frame, or the control information is carried in a previous subframe of the first subframe of the first wireless frame.

2. The method according to claim 1, wherein
   the determining, by an access device, a distribution of a downlink transmission time slot in a first subframe of a first wireless frame comprises:
   determining the distribution of the downlink transmission time slot in the first subframe of the first wireless frame, in a case that a configuration periodicity of the first wireless frame is different from a configuration periodicity of a previous wireless frame of the first wireless frame.

3. The method according to claim 1, wherein
   the determining, by an access device, a distribution of a downlink transmission time slot in a first subframe of a first wireless frame comprises one of:
   determining whether downlink transmission of the first subframe of the first wireless frame occupies a part or all of data channel symbols;
   determining a location of a data channel symbol occupied by the downlink transmission of the first subframe of the first wireless frame;

determining a range of the downlink transmission time slot in the first subframe of the first wireless frame; or determining the distribution of the downlink transmission time slot in the first subframe by determining a type of the first subframe of the first wireless frame.

4. The method according to claim 1, wherein the first subframe is a subframe 6 of the first wireless frame.

5. A transmission control method, comprising:

receiving, by a user terminal, control information carried in a second subframe of a first wireless frame sent by an access device, wherein the control information indicates a distribution of a downlink transmission time slot in a first subframe of the first wireless frame;

determining the distribution of the downlink transmission time slot in the first subframe of the first wireless frame based on the control information; and receiving, by the user terminal, downlink data of the user terminal carried in downlink transmission of the first subframe based on the determined distribution of the downlink transmission time slot in the first subframe, wherein the first subframe is a special subframe in a case that the first wireless frame has a first configuration periodicity, and the first subframe is a downlink subframe in a case that the first wireless frame has a second configuration periodicity, and wherein the first subframe is different from the second subframe or the same as the second subframe.

6. The method according to claim 5, wherein the receiving, by the user terminal, downlink data of the user terminal carried in a downlink transmission of the first subframe based on the determined distribution of the downlink transmission time slot in the first subframe comprises:

in a case that the control information indicates that the downlink transmission of the first subframe occupies a part of data channel symbols, receiving, by the user terminal, the downlink data of the user terminal carried in the downlink transmission of the first subframe via the part of data channel symbols of the first subframe;

in a case that the control information indicates that the downlink transmission of the first subframe occupies all of data channel symbols, receiving the downlink data of the user terminal carried in the downlink transmission of the first subframe via all of the data channel symbols of the first subframe;

in a case that the control information indicates a location of a data channel symbol occupied by the downlink transmission of the first subframe, receiving the downlink data of the user terminal carried in the downlink transmission of the first subframe at the indicated location of the data channel symbol occupied by the downlink transmission of the first subframe;

in a case that the control information indicates a range of the downlink transmission time slot in the first subframe, receiving the downlink data of the user terminal carried in the downlink transmission of the first subframe, within the indicated range of the downlink transmission time slot in the first subframe; or in a case that the control information indicates a type of the first subframe, receiving the downlink data of the user terminal carried in the downlink transmission of the first subframe, within a range of the downlink transmission time slot corresponding to the type of the first subframe.

7. The method according to claim 5, wherein the first subframe is a subframe 6 of the first wireless frame.

8. An access device, comprising:
one or more processors; and
a memory having stored therein program instructions that, when executed by the one or more processors, configure the access device to:

determine a distribution of a downlink transmission time slot in a first subframe of a first wireless frame, wherein the first subframe is a special subframe in a case that the first wireless frame has a first configuration periodicity, and the first subframe is a downlink subframe in a case that the first wireless frame has a second configuration periodicity;

generate control information for indicating the distribution of the downlink transmission time slot in the first subframe; and send the first wireless frame to a user terminal, wherein the control information is carried in a downlink control channel of the first subframe of the first wireless frame, or the control information is carried in a previous subframe of the first subframe of the first wireless frame.

9. The access device according to claim 8, wherein
determining the distribution of the downlink transmission time slot in the first subframe of the first wireless frame comprises:

determining the distribution of the downlink transmission time slot in the first subframe of the first wireless frame, in a case that a configuration periodicity of the first wireless frame is different from a configuration periodicity of a previous wireless frame of the first wireless frame.

10. The access device according to claim 8, wherein
determining the distribution of the downlink transmission time slot in the first subframe of the first wireless frame comprises:

determining whether downlink transmission of the first subframe of the first wireless frame occupies a part or all of data channel symbols; or determining a location of a data channel symbol occupied by the downlink transmission of the first subframe of the first wireless frame; or determining a range of the downlink transmission time slot in the first subframe of the first wireless frame; or determining the distribution of the downlink transmission time slot in the first subframe by determining a type of the first subframe of the first wireless frame.

11. The access device according to claim 8, where
determining the distribution of the downlink transmission time slot in the first subframe of the first wireless frame comprises:

determining the distribution of the downlink transmission time slots in a subframe 6 of the first wireless frame.

12. A user terminal, comprising:
one or more processors; and
a memory having stored therein program instructions that, when executed by the one or more processors, configure the user terminal to:

receive control information carried in a second subframe of a first wireless frame sent by an access device, wherein the control information indicates a distribution of a downlink transmission time slot in a first subframe of the first wireless frame;

determine the distribution of the downlink transmission time slot in the first subframe of the first wireless frame based on the control information; and receive downlink data of the user terminal carried in downlink transmission of the first subframe based on the distribution of the downlink transmission time slot in the first subframe, wherein the first subframe is a special subframe in a case that the first wireless frame has a first configuration periodicity, and the first subframe is a downlink subframe in a case that the first wireless frame has a second configuration periodicity, and wherein the first subframe is different from the second subframe or the same as the second subframe.

13. The user terminal according to claim 12, wherein receiving downlink data of the user terminal carried in downlink transmission of the first subframe based on the distribution of the downlink transmission time slot in the first subframe comprises:

in a case that the control information indicates that the downlink transmission of the first subframe occupies a part of data channel symbols, receiving the downlink data of the user terminal carried in the downlink transmission of the first subframe via the part of data channel symbols of the first subframe;

in a case that the control information indicates the downlink transmission in the first subframe occupies all of data channel symbols, receiving the downlink data of the user terminal carried in the downlink transmission in the first subframe via all of the data channel symbols of the first subframe;

in a case that the control information indicates a location of a data channel symbol occupied by the downlink transmission of the first subframe, receiving the downlink data of the user terminal carried in the downlink transmission of the first subframe, at the indicated location of the data channel symbol occupied by the downlink transmission of the first subframe;

in a case that the control information indicates a range of the downlink transmission time slot in the first subframe, receiving the downlink data of the user terminal carried in the downlink transmission of the first subframe, within the indicated range of the downlink transmission time slot in the first subframe; or in a case that the control information indicates a type of the first subframe, receiving the downlink data of the user terminal carried in the downlink transmission of the first subframe, within a range of the downlink transmission time slot corresponding to the type of the first subframe.

14. The user terminal according to claim 12, wherein determining the distribution of the downlink transmission time slot in the first subframe of the first wireless frame based on the control information comprises:

determining the distribution of the downlink transmission time slots in a subframe 6 of the first wireless frame based on the control information.

15. A communication system, comprising:

an access device configured to determine a distribution of a downlink transmission time slot in a first subframe of a first wireless frame, wherein the first subframe is a special subframe in a case that the first wireless frame has a first configuration periodicity, and the first subframe is a downlink subframe in a case that the first wireless frame has a second configuration periodicity; to generate control information for indicating the determined distribution of the downlink transmission time slot in the first subframe; and to send the first wireless frame to a user terminal, wherein the control information is carried in a downlink control channel of the first subframe of the first wireless frame, or the control information is carried in a previous subframe of the first subframe of the first wireless frame; and a user terminal configured to receive the control information carried in a second subframe of the first wireless frame sent by the access device; to determine the distribution of the downlink transmission time slot in the first subframe of the first wireless frame based on the control information; to receive downlink data of the user terminal carried in the downlink transmission of the first subframe based on the determined distribution of the downlink transmission time slot in the first subframe, wherein the first subframe is different from the second subframe or the same as the second subframe.

* * * * *